United States Patent
Ishikawa

(10) Patent No.: US 7,579,076 B2
(45) Date of Patent: Aug. 25, 2009

(54) UNIT-PIECE PRINTING SHEET AND PROCESS FOR PRODUCING THE SAME

(75) Inventor: Junichi Ishikawa, Kawanoe (JP)

(73) Assignee: Washi Ishikawa Co., Ltd., Kawanoe-shi, Ehime (JP)

( * ) Notice: Subject to any disclaimer, the term of this patent is extended or adjusted under 35 U.S.C. 154(b) by 158 days.

(21) Appl. No.: 10/281,657

(22) Filed: Oct. 28, 2002

(65) Prior Publication Data

US 2003/0232191 A1 Dec. 18, 2003

(30) Foreign Application Priority Data

Jun. 18, 2002 (JP) ............................. 2002-177664

(51) Int. Cl.
*B32B 7/12* (2006.01)
*B32B 15/04* (2006.01)

(52) U.S. Cl. .................. 428/343; 428/354; 428/355 R

(58) Field of Classification Search ................. 428/343, 428/355 R, 354
See application file for complete search history.

(56) References Cited

U.S. PATENT DOCUMENTS

| | | | | |
|---|---|---|---|---|
| 3,072,024 | A | * | 1/1963 | Wengel ...................... 493/330 |
| 5,238,269 | A | * | 8/1993 | Levine ........................... 281/2 |
| 5,407,893 | A | * | 4/1995 | Koshizuka et al. ........... 503/227 |
| 2001/0036525 | A1 | * | 11/2001 | Yokokawa .................... 428/43 |
| 2002/0047263 | A1 | * | 4/2002 | McCarthy et al. ............ 283/107 |
| 2002/0079691 | A1 | * | 6/2002 | Zumberge ..................... 283/81 |
| 2002/0089171 | A1 | * | 7/2002 | Silvestre ....................... 283/61 |
| 2003/0148056 | A1 | * | 8/2003 | Utz et al. ...................... 428/43 |
| 2003/0232191 | A1 | * | 12/2003 | Ishikawa ..................... 428/343 |

FOREIGN PATENT DOCUMENTS

| | | | |
|---|---|---|---|
| JP | 5-318672 | A | 12/1993 |
| JP | 8-286414 | A | 11/1996 |
| JP | 08332690 | A * | 12/1996 |
| JP | 9-158087 | A | 6/1997 |
| JP | 2002-019206 | A | 1/2002 |

OTHER PUBLICATIONS

Derwent Abstract of ZA 9708762A.*
English Abstract of JP 07-160032.*
Abstract of WO 3043822A1; Inventor: Zumberge, G; Date: May 30, 2003.*
Derwent Abstract of WO200194125A1; Inventor: McCarthy et al; Date: Dec. 13, 2001.*
Derwent Abstract of JP 09175064A; Assignee: A One KK; Date: Jul. 8, 1997.*
Machine translation of JP 08-332690. See above for date and inventor.*
Definition of "strain" by Handbook of Plastics and Elastomers, Glossary of Terms, pp. 12.*

* cited by examiner

Primary Examiner—Victor S Chang

(57) ABSTRACT

The present invention provides: a unit-piece printing sheet which gives unit pieces having a smooth cut on the periphery thereof and can be subjected to printing on both front and back of the unit pieces, as well as a process for producing the unit-piece printing sheet. The unit-piece printing sheet comprises both front and back printing base materials laminated via a thermoplastic resin film adhesive layer, wherein each of the printing base materials is divided into sections by forming a slit at each facing position of the front and back printing base materials to form unit pieces, and the portion of the thermoplastic resin film adhesive layer at the slit-forming position is made a breakable connecting portion.

6 Claims, 2 Drawing Sheets

(a)

(b)

UNIT-PIECE PRINTING SHEET AND PROCESS FOR PRODUCING THE SAME

BACKGROUND OF THE INVENTION

A. Technical Field

This invention relates to a unit-piece printing sheet used in printing business cards together and a process for producing the same.

B. Background Art

For conventional preparation of a desired number of cards having the same print and the same dimension, such as business cards and postcards, a special printing machine adapted to the dimensions of each card should be used in printing, and prints by the printing machine are very high in cost.

On the other hand, simultaneous printing of a large number of unit pieces as cards in one printing paper is more efficient than printing of each card. This particularly applies to cards or postcards having the same dimension and the same print.

It's more convenient if such unit-piece printing sheet can be applied not only to a special printer but also to a personal computer printer or a copier in a printing system where a printing plate is not required.

For this purpose, a constitution wherein like a label-forming laminate, a large number of releasable unit pieces are assembled and arranged on a mount is conceivable. In so doing, printing with a copier or a printer can also be made easy. However, when the label-forming unit pieces are released from the mount, a pressure-sensitive adhesive remains on the back of each unit piece, so that when the unit piece is to be immediately stuck on something, the unit piece can be used as it is, but the unit piece is not suitable for use as a card unit piece not intended to be stuck, for example a business card, a postcard, or an event ticket.

To solve the problem, there is a unit-piece printing sheet provided with perforations, comprising fine perforations arranged in a printing paper of large dimensions, and each square divided by the perforations is subjected to printing necessary for a business card, a postcard or an event tickets, and the desired cards are obtained by tearing the sheet into pieces along the perforations. In this constitution, however, an notched cut caused by the perforations is observed on the periphery of each unit piece.

Accordingly, a printing laminate comprising a printing base material laminated via an adhesive layer on a supporting base material, wherein the printing base material comprises unit pieces in aggregate formed not via perforations but via slits was conceivable. This is because given slits, the cut portion as the periphery of each unit piece can be beautifully finished. This laminate is constituted such that each unit piece is made easily releasable by applying a release agent onto the back of the unit piece, but with this constitution given, a sense of incongruity, that is, a sense of extreme smoothness, remains on the back of the released unit piece. In addition, there is the problem that the surface of the supporting base material layer after released from the unit piece is sticky.

To solve this problem, a printing laminate comprising a propylene type resin or another thermoplastic resin layer formed on a supporting base material, in place of an adhesive layer formed on a supporting base material, has been proposed (JP-A 5-318672, JP-A 8-286414, JP-A 9-158087). A thermoplastic resin such as polypropylene resin shows bonding properties (pseudo-adhesion) but is hardly released, and curling of the released unit is inevitable. Another problem is that its release becomes harder as time passes.

To solve this problem, the present inventors invented a unit-piece printing sheet showing excellent pseudo-adhesion, which while facilitating occurrence of pseudo-adhesion between a printing base material and a thermoplastic resin layer, also facilitates occurrence of strong adhesion between a supporting base material and the thermoplastic resin layer, and they filed an application therefor (JP-A 2002-019206). That is, this prior art relates to a printing laminate comprising a printing base material layer laminated on a supporting base material via a thermoplastic resin layer, wherein the printing base material layer is a layer provided with unit pieces in aggregate arranged via slits, and the thermoplastic resin layer is a layer made of linear low-density polyethylene resin, whereby the bonding strength between the printing base material layer and the thermoplastic resin layer is made lower than the bonding strength between the supporting base material layer and the thermoplastic resin layer, and each unit piece is subject to pseudo-adhesion to the supporting base material layer and is easily released therefrom.

SUMMARY OF THE INVENTION

A. Object of the Invention

This prior art printing laminate can give unit pieces each having a smooth cut surface and is thus superior in solving the problem described above, but is under such restriction that only one side of the unit piece serving as a business card or the like can be subjected to printing.

Accordingly, the object of this invention is to provide a unit-piece printing sheet which gives unit pieces having a smooth cut as the periphery thereof and can be subjected to printing on both front and back of unit pieces, as well as a process for producing the unit-piece printing sheet.

B. Disclosure of the Invention

To solve the problem described above, the unit-piece printing sheet according to this invention comprises both front and back printing base materials laminated via a thermoplastic resin film adhesive layer, wherein each of the printing base materials is divided into sections by forming a slit at each facing position of the front and back printing base materials to form unit pieces, and the portion of the thermoplastic resin film adhesive layer at the slit-forming position is made a breakable connecting portion.

In the foregoing, the film is made preferably of a mixed resin of polypropylene resin and polyethylene resin. This is because the film is made so rigid and breakable that when the sheet after printing is torn into unit pieces, the edge of each unit piece can be cut in a beautiful form.

In the unit-piece printing sheet, each of the unit pieces is a business-card paper, and each of the front and back printing base materials can have a slit in a checkerboard pattern to constitute unit pieces in aggregate. In this case, it is preferable that the unit pieces in aggregate are arranged therein with a frame-shaped margin remaining on the periphery thereof.

In the foregoing, the unit-piece printing sheet can be a postcard paper containing one unit piece.

To solve the problem described above, the process for producing a unit-piece printing sheet according to this invention comprises making cuts on both the front and back of a laminate having both front and back printing base materials laminated via a thermoplastic resin film adhesive layer, to form slits for forming unit pieces from both the front and back printing base materials, whereby each of the printing base materials is divided into sections, and simultaneously the portion of the thermoplastic resin film adhesive layer at the slit-forming position is made a breakable connecting portion.

| (Description of Symbols) | |
|---|---|
| 1: | Printing base material |
| 2: | Thermoplastic resin film adhesive layer |
| 3: | Knife edge |
| 11: | Unit piece |
| 12: | Slit |
| 13: | Frame-shaped margin |
| 21: | Breakable connecting portion |

DETAILED DESCRIPTION OF THE INVENTION

Hereinafter, preferable embodiments of this invention are described, but this invention is not limited to the following description.

Figure 1:
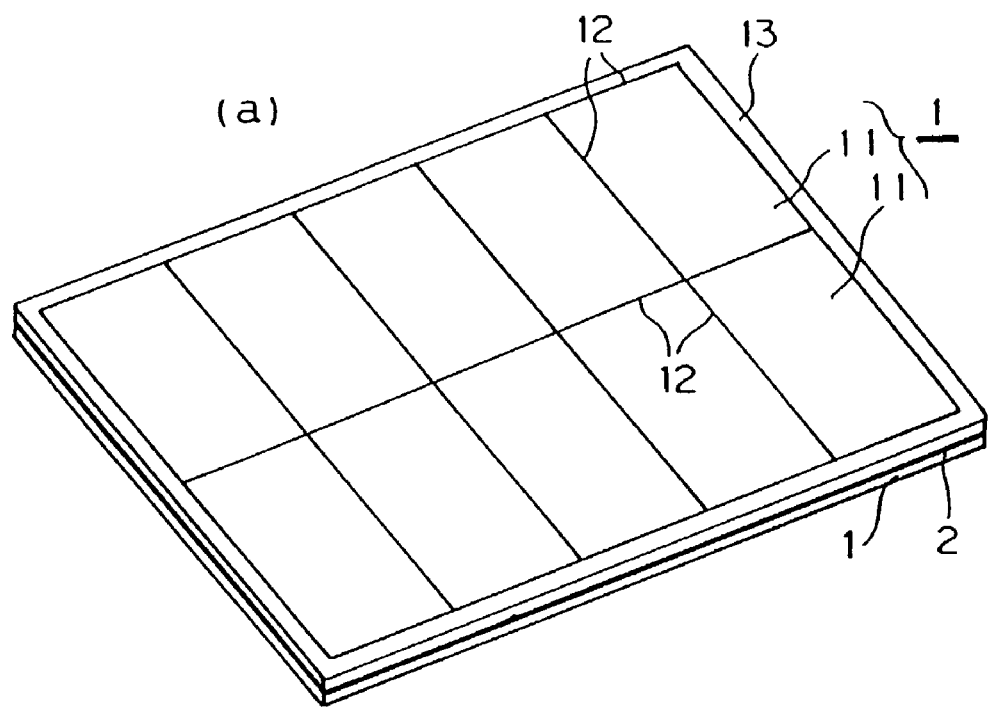
FIG. 1(a) is a perspective view and FIG. 1(b) is a partial sectional view showing an example of the unit-piece printing sheet of this invention.
Figure 1:
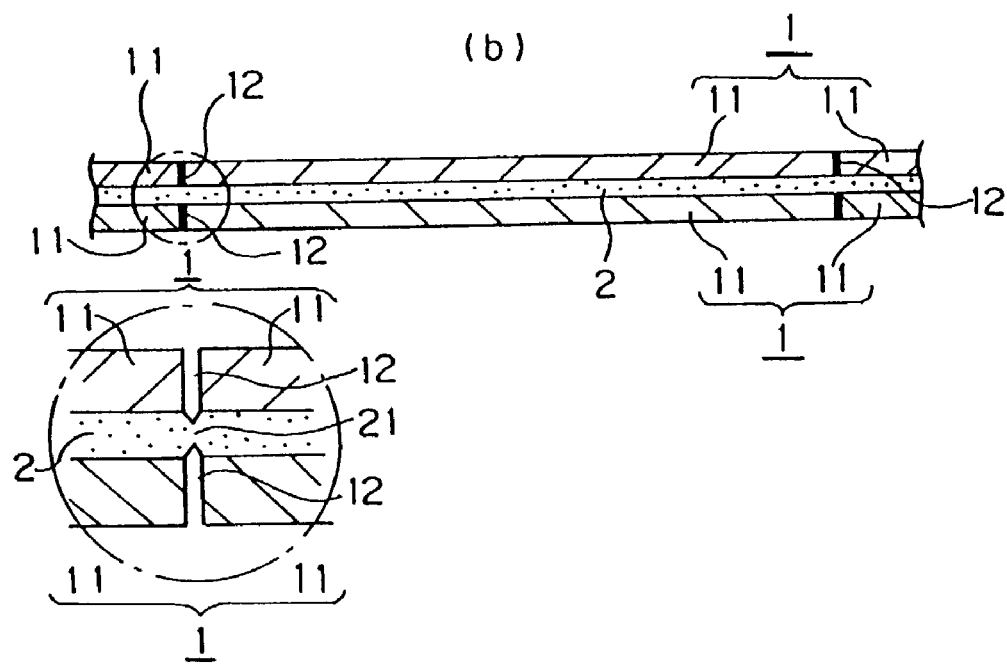

As shown in FIG. 1, the unit-piece printing sheet of the invention comprises both front and back printing base materials 1, 1 laminated via a thermoplastic resin film adhesive layer 2. At the facing position of the printing base materials 1, 1, slits 12 . . . for forming unit pieces 11 in aggregate are formed lengthwise and crosswise to divide the printing base materials 1, 1 into a large number of unit pieces. The unit piece 11 can serve as a business-card paper, a postcard and a photographic paper.

Figure 2:
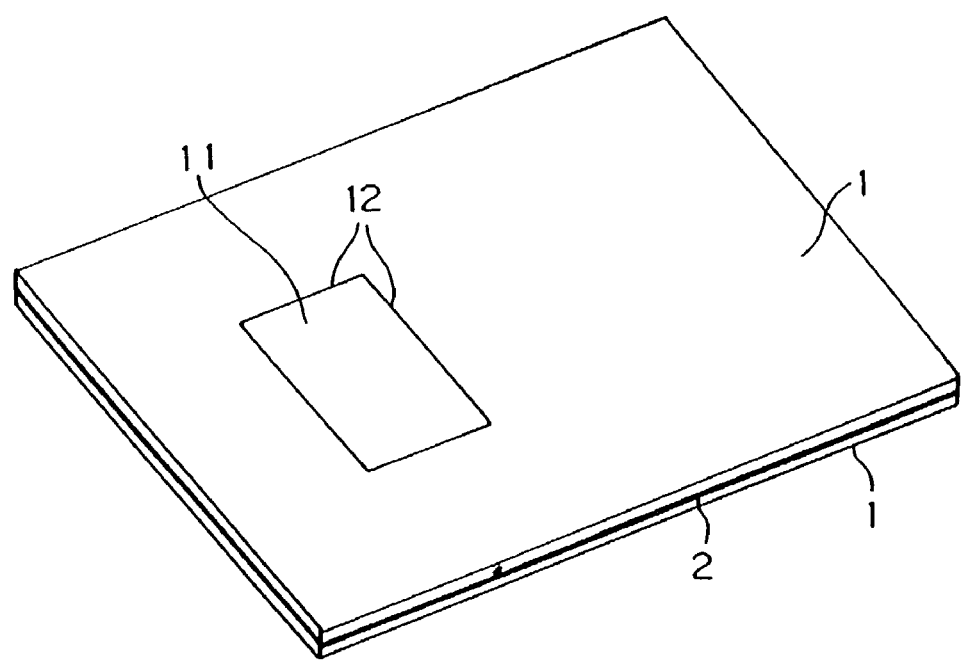
FIG. 2 is a perspective view showing an example wherein the unit-piece printing sheet of this invention is used as a postcard.

In another embodiment as shown in FIG. 2, the whole of the sheet is formed as a postcard, and only one unit piece 11 is divided from the other portion via the slit 12 formed lengthwise and crosswise in the printing base materials 1, 1. In FIG. 2, 2 is a thermoplastic resin film adhesive layer via which the printing base materials 1, 1 are stuck. This postcard is used for direct mail, while the unit piece 11 serves as a business card or the like for a businessperson. The unit piece cut off from the postcard can be used for various purposes depending on the user, e.g. for the purpose of a greeting noticing transfer.

The unit-piece printing sheet can be subjected as such to printing with a copier or a printer, and both the front and back thereof, that is, the front and back printing base materials 1, 1 constituting the front and back of each unit piece 11 are subjected to necessary printing. In the embodiment in FIG. 2, a sales message, an address, a name and a sender address and name may also be printed on portions other than the unit piece 11.

Like business cards, the respective unit pieces 11 may have the same print but can have different prints by printing with a personal computer etc.

Because the unit-piece printing sheet of this invention has the printing base materials on both the front and back thereof, and thus the printing faces of the unit-piece printing sheet can be subjected to printing simultaneously or separately, whereby both faces of the unit piece 11 or of the portion other than the unit piece can be subjected to printing.

In this invention, the thermoplastic resin film adhesive layer 2 works not only for bonding both the front and back printing base materials 1, 1 strongly to each other but also for assembling unit pieces 11 in aggregate into one sheet. That is, the adhesive layer 2 at the time of printing can work for printing the unit pieces 11 simultaneously in aggregate. Further, when printing is finished, the unit pieces 11 should be easily removed and torn to pieces by hand. That is, the portion of the thermoplastic resin film adhesive layer 2 at the slit 12 forming position should be a breakable connecting portion 21 for facilitating the "tearing".

Figure 3:
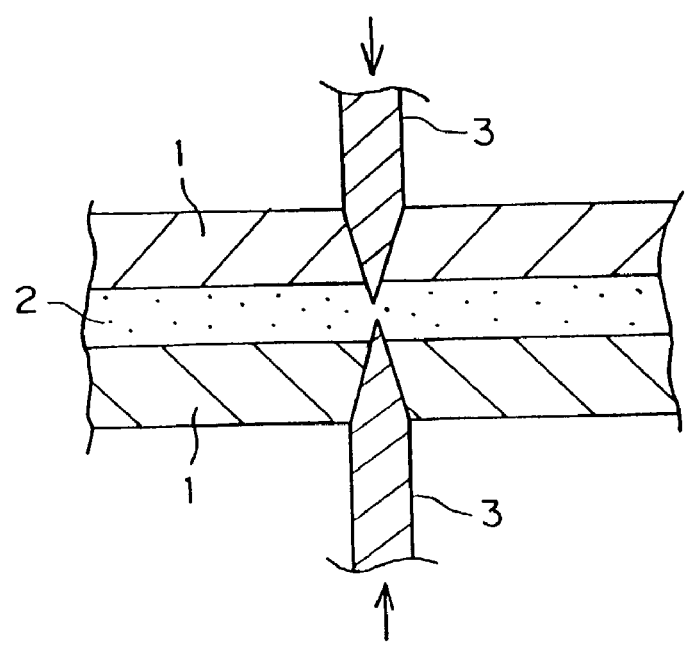
FIG. 3 is a partial sectional view showing the step of forming slits in the printing base materials in the process for producing the unit-piece printing sheet of this invention.

When the printing base materials 1, 1 as the front and back of the sheet are provided with cuts to form slits in the process of this invention, the thermoplastic resin film adhesive layer 2 is provided with a slight cut in order to cut the printing base material 1 off with a knife edge 3, as shown in FIG. 3. For example, when the thermoplastic resin film adhesive layer 2 has a thickness of 35 µm, the film is cut to a depth of about 10 µm from both the sides respectively. As a result, as shown in the enlarged FIG. 1(b) encircled by the dotted line, a portion corresponding to slit 12 in the thermoplastic resin film adhesive layer 2 is formed into a breakable connecting portion 21 which is as thin as about 10 to 15 µm, and the thermoplastic resin adhesive layer 2 is continuous with the remaining connecting portion 21. That is, the connecting portion 21 is made breakable by pressure applied from the knife edge 3. When the film of the thermoplastic resin film adhesive layer 2 is a rigid and breakable film, the film is made breakable by a strain or the like at the microscopic level.

Depending on the film material and the shape of the cuts, the linking portion may not necessarily be thin, but even if its thickness is not reduced, this connecting portion is made breakable by a procedure of compression upon cutting. Please see FIG. 1(b) showing opposing slits 12. Please see FIG. 3 showing opposing knives edges 3.

The connecting portion 21 is thus made breakable by compression deformation etc. so that after printing is finished, the unit piece-printing sheet is bent along the slit 12 . . . , whereby the sheet can be easily divided into the unit pieces 11 . . . having a smooth cut portion as the periphery of each unit piece 11.

According to the production process of this invention, the laminate having both the front and back printing base materials 1, 1 laminated via the thermoplastic resin film adhesive layer 2 is provided with cuts on both the front and back thereof in the slit-forming process so as to form breakable connecting portions in the thermoplastic resin film adhesive layer, and the unit-piece printing sheet of this invention can thus be easily produced.

The thermoplastic resin film for constituting the thermoplastic resin film adhesive layer 2 should, in the meaning described above, have adhesion and be made breakable by compression deformation etc. upon cutting for forming slits 12 . . . ; that is, for easily cutting the unit pieces 11 off and simultaneously preventing the unit pieces in aggregate from being torn due to traction of a printing roller during printing, the resin though not intended to be limited is preferably a mixed resin of polypropylene resin and polyethylene resin. The compounding ratio of the polyethylene resin to the polypropylene resin is determined preferably in consideration of the printing base materials, but the mixing ratio, that is, polypropylene resin: polyethylene resin is 60 to 90 parts by weight: 40 to 10 parts by weight, though being not intended to limit the invention. The polyethylene includes low-density polyethylene, medium-density polyethylene, high-density polyethylene and linear chain low-density polyethylene.

In this invention, the film constituting the thermoplastic resin film adhesive layer 2 may be the one further compounded with another thermoplastic resin in such a range that the effect of the mixed resin of polypropylene resin and polyethylene resin is not deteriorated.

The laminate used in the process of this invention, that is, the laminate comprising both the front and back printing base materials 1, 1 and the thermoplastic resin film adhesive layer 2 for sticking the base materials has the thermoplastic resin film adhesive layer 2 between both the front and back printing base materials 1, 1 so that when both the front and back printing base materials 1 are provided with slits 12 . . . (in the pulling process), the thermoplastic resin film adhesive layer 2 works for adsorbing pressure applied from knife edges 3, 3, thus preventing the whole of the unit-piece printing sheet from being cut into pieces.

In this invention, the method of making the laminate having both the front and back printing base materials 1, 1 laminated via the thermoplastic resin film 2 is not limited, and conventionally used various lamination techniques may also be adopted, but a lamination technique called sandwich lamination is generally used.

The sandwich lamination is a method wherein the thermoplastic adhesive resin only, or a coating material containing this adhesive resin to which pigments and other fillers such as synthetic silica, calcium carbonate, clay, titanium oxide, carbon, plastic pigment, starch and silk powder, and various additives such as dispersants, deforming agents, antioxidants and other assistants have been added if necessary, is applied onto one surface of a continuously delivered material as the printing base material 1 and extruded in a molten state to form a film through a T-die film-making machine, and before this film layer is solidified, the printing base material delivered from the side of a sand axis is laminated on the film layer which is then contact-bonded in an integrated body under cooling between cooling rolls and nip rolls.

In this lamination process, the melting temperature of the coating material for the thermoplastic resin film and the contact-bonding pressure on the printing base materials are determined preferably in consideration of the base materials and the composition of the coating material.

Alternatively, the laminate comprising the printing base materials and the thermoplastic synthetic resin film adhesive layer can also be produced by applying an adhesive onto one surface of the material as the printing base material 1, drying it, laminating another thermoplastic resin film 1 via the adhesive resin film on the printing base material 1 and contact-bonding them through heating rolls. As the film material, a polypropylene, acryl, polyester or acetate films can be used. That is, these resins have hardness, and upon force-cutting, form breakable connecting portions in the thermoplastic resin film adhesive layer by pressure applied from knives, and the laminate can be easily torn into pieces along the slits of the printing base materials. Further, the printing laminate itself is flexible and hardly bent and thus most suitable for use as business cards and postcards.

In this invention, it is preferable that the laminated face of the printing base material 1 has previously been subjected to corona treatment etc. in order to improve the adhesion between the printing base material 1 and the thermoplastic resin film adhesive layer 2.

In this invention, the printing base material 1, though not intended to be limited, preferably uses a paper suitable for an ink jet printer or a laser printer; that is, a paper material or a special film whose surface is treated so as to be proper for office automation devices is preferably used for the object of this invention. Specifically, a paper having a basis weight of 50 to 110 g/m$^2$, such as an ink jet coating paper, Japanese paper, color laser paper etc. can be used when the unit piece is used as a business card or a postcard. This is because when the unit piece is used as a business card or a postcard, the thickness of the unit-piece printing sheet is preferably 200 to 300 μm for Western paper or about 320 μm for Japanese paper. Fillers, that is, filling materials are contained in a large amount in the surface or in the inside of the paper material used in the printing base material 1, in order to improve the toughness of the paper itself, and in so doing, a majority of voids in fine fibers constituting the paper material are embedded with the fillers, and thus the thermoplastic resin in a molten state in the lamination process hardly penetrates into the paper material, and does not have an influence on the finish of a print on the paper material used in the printing base material 1.

According to the process for producing a printing laminate according to this invention, both the front and back of the printing laminate are provided with cuts by knives in a direction perpendicular to the printing face of the printing base material 1 and then force-cut so as to form breakable connecting portions in the thermoplastic resin film adhesive layer, whereby slits are formed on only the printing base material 1 without cutting off the thermoplastic resin film adhesive layer 2, and by the pressure applied from the knives, breakable connecting portions are formed among the unit pieces on the thermoplastic resin film adhesive layer 2.

The method of forming slits lengthwise and crosswise so as to form unit pieces in aggregate on both the front and back printing base materials is not particularly limited, but a method by double-side Thomson pulling or a method by slit processing is preferable. "Force-cutting" for making cuts on the thermoplastic resin film adhesive layer is preferable.

Each of said independent sections is defined by a periphery extending completely around each of said independent sections. Each of said independent sections is independent via cuts defining the periphery of each of said independent sections.

Double-side Thomson pulling is a method wherein two sheets of plywood each having a flat surface in which a knife is implanted so as to fit to a slit shape on a laminate are prepared and pushed against both the front and back surface of printing base materials respectively in a direction perpendicular to the printing face of each printing base material layer, whereby the thermoplastic resin film adhesive layer is provided with cuts thereon by force-cutting, to make slits in the printing base materials.

Slit processing is a method wherein the unit-piece printing sheet is passed between upper and lower rotating knives, to form slits in the printing base materials. For example, the unit-piece printing sheet is first passed in a length direction between the rotating knives to form slits and then passed through in a width direction between the rotating knives newly arranged for adjusting the interval therebetween, thus giving slits in a checkerboard pattern to from unit pieces in aggregate. The interval between the upper and lower rotating knives is determined to form such slits as to provide suitable cuts on the thermoplastic resin film adhesive layer.

In this invention, the pressure applied from the removing knifes to the printing laminate in the pulling process is determined preferably in consideration of the material and thickness of the printing laminate, the composition of the thermoplastic resin film adhesive layer, etc.

An example of the unit-piece printing sheet using the two elements, that is, a business card coating paper as printing base material 1 and a mixed resin of polypropylene resin and polyethylene resin as thermoplastic resin film adhesive layer 2, is described below in more detail.

By using a mixed resin of polypropylene resin and polyethylene resin as the thermoplastic resin, the laminate itself is not cut into pieces in the pulling process and can be divided easily into unit pieces at a breakable connecting portion formed by the pressure applied from the knifes to the thermoplastic resin film adhesive layer.

Though not intended to be limited, the coating material for thermoplastic resin film, which comprises a mixed resin of polypropylene resin and polyethylene resin as the essential components, is preferably the one having a melting point of 270 to 350° C.

The pressure in the contact-bonding process carried out after sandwich lamination is preferably 0.9 to 1.4 kg/m$^2$, more preferably 0.9 to 1.1 kg/m$^2$, particularly preferably 1.0 kg/m$^2$ or so.

The thickness of the thermoplastic resin film adhesive layer 2 is preferably 20 to 50 μm, particularly preferably 25 to 40 μm. This is because when the thickness of the thermoplastic resin film adhesive layer 2 is 50 μm or more, the portion corresponding to the breakable connecting portion 21 of the thermoplastic resin film adhesive layer 2, when divided into unit pieces 11 . . . by bending the sheet along slits 12, is not made breakable even by bending, and tends to be hardly torn into pieces by hand, while when the thickness is 20 μm or less, the printing unit pieces in aggregate tend to be cut off by force-cutting.

If it is necessary to further enhance the adhesion between the printing base materials 1, 1 such as business card coating paper and the thermoplastic resin film adhesive layer 2, the laminated surface of the business card coating paper 1 is previously subjected to corona treatment.

In the unit-piece printing sheet of this invention, the unit pieces 11 . . . may be formed to the periphery of the printing base material 1, but in so doing, when the fingertips or the like tough the periphery of the printing base material 1, the unit piece 11 at the peripheral position may be torn from the edge thereof. Accordingly, as shown FIG. 1(*a*), the printing base material 1 is provided therearound with the frame-shaped margin 13, and this frame is provided therein with unit pieces in aggregate 11. . . . By doing so, the frame-shaped margin can be prevent the unit pieces 11 from being torn from the edge thereof.

(Effects and Advantages of the Invention):

According to this invention, there is provided a sheet for printing unit pieces capable of separation as cards having a smooth cut portion, such as business cards, postcards or photographic cards, and both the front and back of the unit piece can be subjected to printing.

Each of the unit pieces can be a structure that includes a section of the front printable base material, a section of the back printable base material, and a section of the thermoplastic resin film adhesive layer laminated between said section of the front printable base material, and said section of the back printable base material, wherein said section of the front printable base material includes print, wherein said section of the back printable base material includes print, such that both sides of the structure is printed, such that the structure is broken from said unit-piece printable sheet, such that said section of the front printable base material having print remains on said structure and said thermoplastic resin film adhesive layer, such that said section of the back printable base material having print remains on said structure and said thermoplastic resin film adhesive layer, and such that said section of said thermoplastic resin film adhesive later remains in the structure.

According to the process for producing a unit-piece printing sheet in this invention, such a unit-piece printing sheet can be easily obtained.

The thermoplastic resin film includes portions disposed between said cuts of the front printable base material and back printable base material, wherein said thermoplastic resin film includes portions that are not disposed between said cuts of the front printable base material and back printable base material, and wherein said portions that are disposed between said cuts are compressed relative to said portions that are not disposed between said cuts, such that the thermoplastic resin film is separable at the points of abutment.

What is claimed is:

1. A unit-piece composite printable sheet comprising:
    a) a front printable paper base material subdivided into independent sections by slits, with said front printable paper base material being a first layer of said unit-piece composite printable sheet;
    b) a back printable paper base material subdivided into independent sections by slits opposing said slits in said front printable paper base material, with said back printable paper base material being a second layer of said unit-piece composite printable sheet;
    c) a thermoplastic resin film adhesive layer located between and being bonded directly to the front and back printable paper base materials, with said thermoplastic resin film adhesive layer being a third layer of said unit-piece composite printable sheet, with said thermoplastic resin film adhesive layer being rigid and breakable, and directly bonding the front and back printable paper base materials;
    d) wherein the independent sections of the front and back printable paper base materials are laminated and permanently adhered directly to the thermoplastic resin film adhesive layer in abutting continuous arrays on opposite sides of the thermoplastic resin film adhesive layer such that the sections of the front printable paper base material align vertically with the sections of the back printable paper base material and the thermoplastic resin film adhesive layer maintains the sheet structure for the composite;
    e) wherein the thermoplastic resin film adhesive layer is separable at the points of abutment of the independent sections so as to enable the unit-piece composite printable sheet to be neatly broken into independent sections with clean edges;
    f) wherein the front printable paper base material and wherein the back printable paper base material define a paper material, thermoplastic resin film adhesive layer, paper material composite;
    g) wherein the front printable paper base material includes slits that extend only through the front printable paper base material to provide for said independent sections, and wherein the back printable paper base material includes slits that extend only through the back printable paper base material to provide for said independent sections, wherein each of said independent sections is defined by a periphery extending completely around each of said independent sections, and wherein each of said independent sections is independent via said slits defining the periphery of each of said independent sections;
    h) wherein said thermoplastic resin film adhesive layer is disposed between said slits in the front printable paper base material and back printable paper base material and includes breakable connecting portions in the areas of the slits in the front printable paper base material and the back printable paper base material such that said breakable connecting portions of said thermoplastic resin film adhesive layer define breakable lines in the areas of the slits in the front and back printable paper base materials, and said slits are formed only in the front and back printable paper base material without a reduction in thickness of the connecting portion; and i) wherein, by pressure applied from knives, breakable connecting portions are formed among the unit pieces on the thermoplastic resin film adhesive layer.

2. A unit-piece composite printable sheet according to claim 1, wherein said thermoplastic resin film adhesive layer is a film comprising a mixed resin of polypropylene resin and polyethylene resin.

3. A unit-piece composite printable sheet comprising:
a) a front printable paper base material subdivided into independent sections by slits, with said front printable paper base material being a first layer of said unit-piece composite printable sheet;
b) a back printable paper base material subdivided into independent sections by slits opposing said slits in said front printable paper base material, with said back printable paper base material being a second layer of said unit-piece composite printable sheet;
c) a thermoplastic resin film adhesive layer located between and being bonded directly to the front and back printable paper base materials, with said thermoplastic resin film adhesive layer being a third layer of said unit-piece composite printable sheet;
d) wherein the independent sections of the front and back printable paper base materials are laminated and permanently adhered directly to the thermoplastic resin film adhesive layer in abutting continuous arrays on opposite sides of the thermoplastic resin film adhesive layer such that the sections of the front printable paper base material align vertically with the sections of the back printable paper base material and the thermoplastic resin film adhesive layer maintains the sheet structure for the composite;
e) wherein the thermoplastic resin film adhesive layer is separable at the points of abutment of the independent sections so as to enable the unit-piece composite printable sheet to be neatly broken into independent sections with clean edges;
f) wherein the front printable paper base material and wherein the back printable paper base material define a paper material, thermoplastic resin film adhesive layer, paper material composite;
g) wherein the front printable paper base material includes slits that extend only through the front printable paper base material to provide for said independent sections, and wherein the back printable paper base material includes slits that extend only through the back printable paper base material to provide for said independent sections, wherein each of said independent sections is defined by a periphery extending completely around each of said independent sections, and wherein each of said independent sections is independent via said slits defining the periphery of each of said independent sections;
h) wherein said thermoplastic resin film adhesive layer includes breakable connecting portions in an area of said slits of the front printable paper base material and back printable paper base material, wherein said thermoplastic resin film adhesive layer includes portions that are not disposed between said slits of the front printable paper base material and back printable paper base material, wherein said breakable connecting portions are compressed portions relative to said portions that are not disposed between said slits, such that the thermoplastic resin film adhesive layer is separable at the points of abutment, said compressed portions being formed by a compression force applied by cutting said front and back printable paper base materials without cutting said thermoplastic resin film adhesive layer, and said slits are formed only in the front and back printable paper base material without a reduction in thickness of the connecting portion; and
i) wherein, by pressure applied from knives, breakable connecting portions are formed among the unit pieces on the thermoplastic resin film adhesive layer.

4. A unit-piece composite printable sheet according to claim 3, wherein said thermoplastic resin film adhesive layer is a film comprising a mixed resin of polypropylene resin and polyethylene resin.

5. The unit-piece composite printable sheet according to claim 1, wherein each said unit-piece is a business card.

6. The unit-piece composite printable sheet according to claim 3, wherein each said unit-piece is a business card.

* * * * *